United States Patent
Kim

(10) Patent No.: US 7,626,664 B2
(45) Date of Patent: Dec. 1, 2009

(54) LCD DEVICE AND METHOD HAVING FIRST AND SECOND ALIGNMENT LAYERS ARRANGED ON RESPECTIVE FIRST AND SECOND ELECTRODES EACH LAYER HAVING PRETILT ANGLES RANGING BETWEEN 5 TO 20 DEGREES

(75) Inventor: Sang-Wook Kim, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 514 days.

(21) Appl. No.: 11/265,194

(22) Filed: Nov. 3, 2005

(65) Prior Publication Data

US 2006/0098149 A1 May 11, 2006

(30) Foreign Application Priority Data

Nov. 11, 2004 (KR) ............... 10-2004-0092127

(51) Int. Cl.
*G02F 1/1333* (2006.01)
(52) U.S. Cl. ............... 349/138; 349/112; 349/113
(58) Field of Classification Search .......... 349/112, 349/113, 138; 428/1.1
See application file for complete search history.

(56) References Cited

U.S. PATENT DOCUMENTS

| | | | | |
|---|---|---|---|---|
| 5,384,168 A * | 1/1995 | Dubal et al. | ............... | 428/1.25 |
| 5,668,616 A * | 9/1997 | Nakamura et al. | .......... | 349/128 |
| 5,859,683 A * | 1/1999 | Tagusa et al. | ............... | 349/138 |
| 6,344,888 B2 * | 2/2002 | Yasukawa | ............... | 349/113 |
| 6,590,630 B2 * | 7/2003 | Kim | ............... | 349/192 |
| 6,791,636 B2 * | 9/2004 | Paolini et al. | ............... | 349/61 |
| 6,822,704 B2 * | 11/2004 | Sakamoto et al. | ............. | 349/44 |
| 6,950,169 B2 * | 9/2005 | Ma et al. | ............... | 349/146 |
| 6,963,382 B1 | 11/2005 | Yamazaki et al. | | |
| 7,006,177 B2 * | 2/2006 | Hirakata et al. | ............. | 349/110 |
| 7,342,630 B2 * | 3/2008 | Satake | ............... | 349/138 |

FOREIGN PATENT DOCUMENTS

| | | |
|---|---|---|
| JP | 2000-356786 | 12/2000 |
| JP | 2001-305547 | 10/2001 |
| JP | 2002-169160 | 6/2002 |
| JP | 2003-149623 | 5/2003 |
| JP | 2003-228085 | 8/2003 |
| KR | 2000-0077257 | 12/2000 |

OTHER PUBLICATIONS

Korean Office Action of the Korean Patent Application No. 10-2004-0092127, mailed on Jul. 3, 2006.
*The Office Action* from the Japanese Patent Office issued in Applicant's corresponding Japanese Patent Application No. 2005-152815 dated Aug. 26, 2008.

* cited by examiner

*Primary Examiner*—John Heyman
(74) *Attorney, Agent, or Firm*—Robert E. Bushnell, Esq.

(57) ABSTRACT

A Liquid Crystal Display (LCD) device includes: a first substrate; a conductive layer arranged on one surface of the first substrate; an insulating layer arranged on the conductive layer and having a thickness of 3 μm or more; first electrodes arranged on the insulating layer and spaced apart from each other by an interval of 3 μm or less; a second substrate including a second electrode arranged on one surface to face the first substrate; and a liquid crystal layer interposed between the first and second substrates.

25 Claims, 7 Drawing Sheets

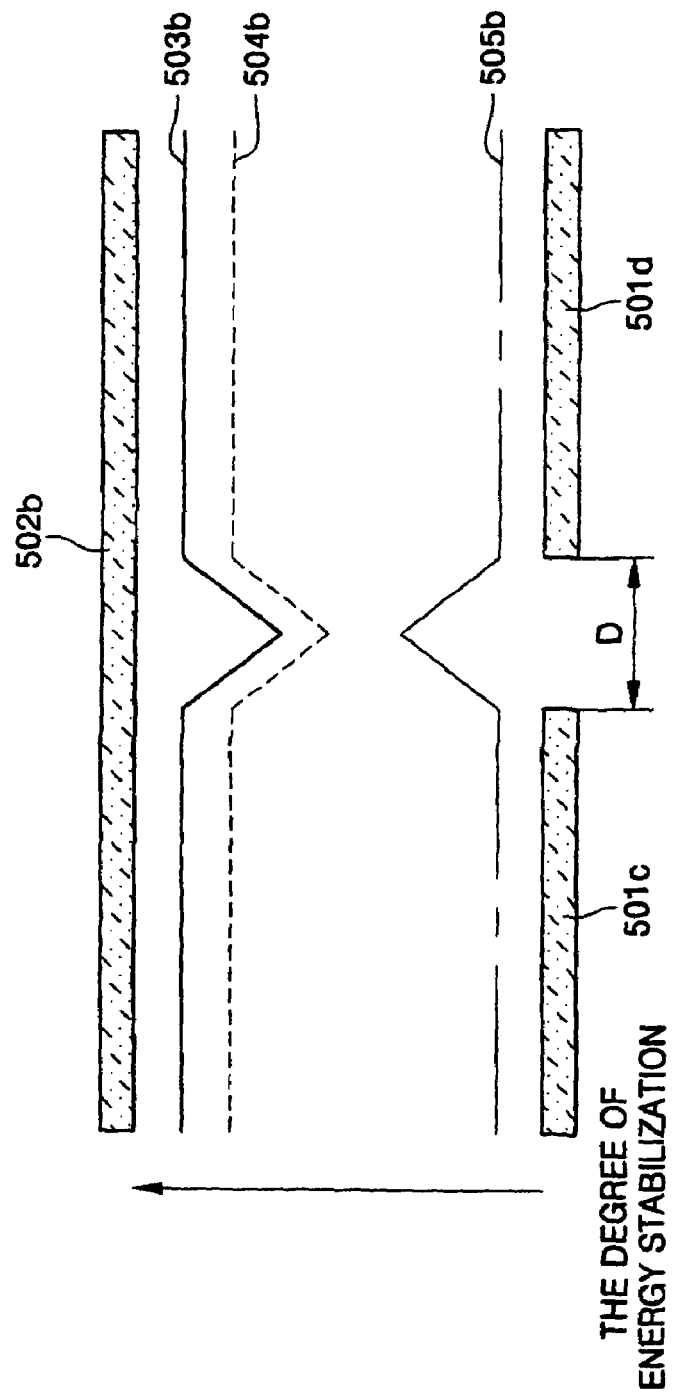

LCD DEVICE AND METHOD HAVING FIRST AND SECOND ALIGNMENT LAYERS ARRANGED ON RESPECTIVE FIRST AND SECOND ELECTRODES EACH LAYER HAVING PRETILT ANGLES RANGING BETWEEN 5 TO 20 DEGREES

CLAIM OF PRIORITY

This application makes reference to, incorporates the same herein, and claims all benefits accruing under 35 U.S.C. §119 from an application for LIQUID CRYSTAL DISPLAY DEVICE AND METHOD OF FABRICATING THE SAME earlier filed in the Korean Intellectual Property Office on Nov. 11, 2004 and there duly assigned Serial No. 2004-92127.

BACKGROUND OF THE INVENTION

1. Field of the Invention

The present invention relates to a Liquid Crystal Display (LCD) device and method of manufacture thereof and, more particularly, to an LCD device and method of manufacture thereof, in which first electrodes are spaced apart from each other by 3 μm or less and an insulating layer is spaced apart from a metal interconnection disposed below the first electrodes by 3 μm or more when a pixel electrode is formed.

2. Description of the Related Art

In recent years, as the information society is rapidly advanced, a display field is being developed which processes and displays large amounts of mass storage information. Cathode-Ray Tubes (CRTs) have been the main type of display up until now. However, CRTs have drawbacks of heavyweight, large-size, and high power consumption.

To avoid these drawbacks, considerable attention has been paid to flat panel displays, and LCD devices particularly attract attention because of their advantages of thin-size, light-weight, and low power consumption.

An LCD device uses optical anisotropy and polarization properties of the liquid crystal. Since the liquid crystal has a long structure, it has an orientation in molecule alignment, and the direction of the molecule alignment can be controlled by forcibly supplying an electric field to the liquid crystal. The alignment direction of the liquid crystal molecules can be controlled by the electric field so that the optical anisotropy can be controlled, which can accordingly control the amount of light transmitted or reflected by the liquid crystal to display image information on a screen.

In order for the LCD device to have a fast response speed and a wide viewing angle, an Optically Compensated Bend (OCB) technique has been developed.

According to the OCB LCD device, alignment layers which are rubbed in the same direction are formed on a pixel electrode and a common electrode, and a liquid crystal is injected between the pixel electrode and the common electrode. Then a high voltage is supplied at an early stage to cause the liquid crystal to be phase-changed from a splay phase to a bend phase, and the liquid crystal is controlled to be turned on and off to display image information.

However, the above-described OCB LCD device has drawbacks in that an initial voltage for causing the phase change into the bend phase is high, phase propagation to an adjacent pixel is difficult, and several seconds are needed for the phase change to occur.

SUMMARY OF THE INVENTION

The present invention, therefore, solves the aforementioned problems by providing an LCD device and method of fabricating the LCD device, in which first electrodes, i.e., pixel electrodes, are spaced apart from each other by 3 μm or less and an insulating layer is spaced apart from a metal interconnection disposed below the first electrodes by 3 μm or more.

In one exemplary embodiment according to the present invention, a Liquid Crystal Display (LCD) device is provided, the device comprising: a first substrate; a conductive layer arranged on one surface of the first substrate; an insulating layer arranged on the conductive layer and having a thickness of 3 μm or more; first electrodes arranged on the insulating layer and spaced apart from each other by an interval of 3 μm or less; a second substrate including a second electrode arranged on one surface to face the first substrate; and a liquid crystal layer interposed between the first and second substrates.

The conductive layer is preferably arranged below the first electrodes.

The insulating layer preferably comprises a planarization layer.

The insulating layer preferably comprises BenzoCycloButene (BCB) or an acrylic-based material.

The conductive layer preferably comprises a metal interconnection.

The metal interconnection preferably comprises one of a scan line, a data line, and a common line.

The LCD device further comprises a first alignment layer arranged on the first electrodes and a second alignment layer arranged on the second electrode.

The first and second alignment layers preferably have been rubbed in the same direction.

The first and second alignment layers preferably each have pretilt angles in a range of 5° to 20°.

The first and second alignment layers preferably each have a thickness in a range of 500 Å to 1000 Å.

The LCD device preferably further comprises a first polarizer arranged on another surface of the first substrate and a biaxial compensation film and a second polarizer arranged on another surface of the second substrate.

A polarization axis of the first polarizer preferably crosses that of the second polarizer.

The liquid crystal layer preferably has a thickness in a range of 1.5 μm to 2.5 μm.

The liquid crystal layer is preferably phase-changed from a splay phase to a bend phase in response to a potential difference between the first electrodes and the second electrode being in a range of 15V to 25V.

A change time of the liquid crystal layer is preferably in a range of 0.2 second to 1 second.

The liquid crystal layer preferably comprises a liquid crystal having a positive dielectric anisotropy.

The LCD device preferably further comprises a light source on another surface of the first substrate.

The light source preferably includes a reflector, a diffuser, and a Light Emitting Diode (LED).

The LED is preferably at least one of a Red (R), Green (G) and Blue (b) group and a Cyan (C), Magenta (M) and Yellow (Y) group.

The LED is alternatively preferably white (W).

The LCD device preferably further comprises a color filter arranged between the second electrode and the second substrate.

The liquid crystal layer preferably comprises an Optically Compensated Bend (OCB) liquid crystal.

In another exemplary embodiment according to the present invention, a method of fabricating a Liquid Crystal Display (LCD) device is provided, the method comprising: forming a first substrate; forming a conductive layer on the first substrate; forming an insulating layer having a thickness of 3 μm or more on the first substrate where the conductive layer has already been formed; forming a first electrode material on the first substrate where the insulating layer has already been formed; patterning the first electrode material to form first electrodes spaced apart from each other by 3 μm or less; forming a second substrate; forming a second electrode on the second substrate; encapsulating the first and second substrates to have the first electrodes and the second electrode face each other; and filling a liquid crystal between the first and second substrates to form a liquid crystal layer.

The method preferably further comprises forming a first alignment layer after the formation of the first electrodes and forming a second alignment layer after the formation of the second electrode.

The method preferably further comprises rubbing the first and second alignment layers in the same direction after the formation of the first and second alignment layers.

Forming the insulating layer preferably comprises forming a layer with BenzoCycloButene (BCB) or an acrylic-based material using a spin coating method.

Encapsulating the first and second substrates preferably comprises spacing the first and second substrates apart from each other by a gap of 1.5 μm to 2.5 μm.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein:

FIGS. 5A and 5B are schematic views for explaining an energy distribution between a second electrode and first electrodes in an LCD device not in accordance with the present invention and an LCD device in accordance with the present invention, respectively.

DETAILED DESCRIPTION OF THE INVENTION

Figure 1:
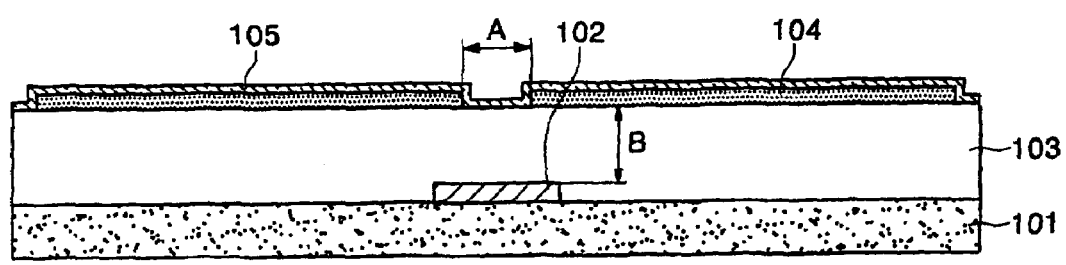
FIGS. 1 to 4 are cross-sectional views of a method of fabricating an LCD device in accordance with an embodiment of the present invention.

The present invention will now be described more fully hereinafter with reference to the accompanying drawings, in which exemplary embodiments of the present invention are shown. The present invention can, however, be embodied in different forms and should not be construed as being limited to the embodiments set forth herein. Rather, these embodiments are provided so that this disclosure is thorough and complete and fully conveys the scope of the present invention to those skilled in the art. The thicknesses of layers or regions shown in the drawings are exaggerated for clarity. The same reference numerals are used to denote the same elements throughout the specification.

FIGS. 1 to 4 are cross-sectional views of a method of fabricating an LCD device in accordance with an embodiment of the present invention.

Referring to FIG. 1, elements such as a scan line, a data line, and a common line are formed on one surface of a first substrate 101 which is a transparent substrate such as glass or plastic. The scan line, the data line, and the common line are formed of a conductive metal interconnection 102 in order to supply an electrical signal to each pixel. A Thin Film Transistor (TFT) and a capacitor may be further formed on the one surface of the first substrate 101.

Subsequently, a passivation layer for protecting lower elements or an insulating layer 103 such as a planarization layer for removing lower morphology is formed on the substrate where the elements have already been formed. The insulating layer 103 is formed of a high molecular material, such as BenzoCycloButene (BCB) or an acrylic-based material, is stacked in one or more layers by a spin-coating method and has a thickness of 3 μm or more.

Subsequently, a first electrode material of a transparent conductor, such as Indium Tin Oxide (ITO) or Indium Zinc Oxide (IZO), is deposited on the substrate having the insulating layer 103 using a Physical Vapor Deposition (PVD) or Chemical Vapor Deposition (CVD) method.

The first electrode material is then patterned to form first electrodes 104. The first electrodes 104 are spaced apart from each other by an interval (i.e. length denoted by A) of 3 μm or less as shown in FIG. 1. The interval between the first electrodes 104 is decreased to have a region which overlaps the metal interconnection 102 below as shown in FIG. 1, and a parasitic capacitor is formed in an interval (B) between the first electrodes 104 and the metal interconnection 102 when the thickness of the insulating layer is thin, which adversely affects the property of the LCD device. However, the insulating layer 103 is formed to be sufficiently thick (3 μm or more) in the present invention, so that the parasitic capacitor between the first electrodes 104 and the metal interconnection 102 is not formed.

Because each region of pixels is generally defined by the metal interconnections 102, the metal interconnections 102, such as the scan line, the data line, and the common line, are positioned below the first electrodes 104. That is, the scan line, the data line, and the common line are perpendicular to each other, wherein a region divided by the scan line, the data line, and the common line is defined as one pixel.

Subsequently, a high molecular material, such as polyimide, is used to form a first alignment layer 105 having a thickness of 500 Å to 1000 Å on the substrate where the first electrodes 104 have already been formed. The method of forming the alignment layer includes a spinning method, a dipping method, and a roller coating method. The roller coating method is preferably used.

A process of rubbing the alignment layer in a specific direction is then carried out. The alignment layer has grooves formed in a constant direction, which serves to have the liquid crystal to be injected later oriented in the constant direction.

Figure 2:
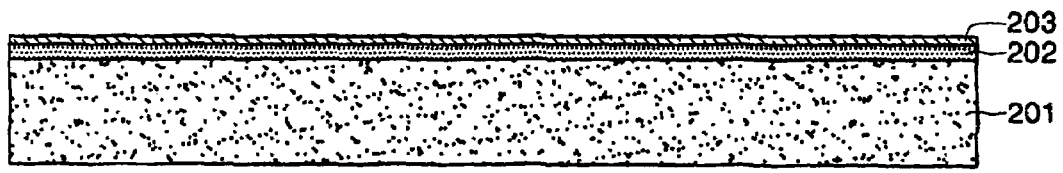

Referring to FIG. 2, a second common electrode 202 is formed on one surface of a second transparent substrate 201, such as glass or plastic. The second electrode 202 is formed of a transparent conductor, such as ITO or IZO, using a PVD or CVD method.

A second alignment layer 203 having a thickness of 500 Å to 1000 Å is then formed on the second substrate 201 where the second electrode 202 has already been formed. The second alignment layer 203 is of a high molecular material, such as a polyimide, and is formed by one of a spinning method, a dipping method, or a roller coating method as is done with the first alignment layer 104.

The second alignment layer 203 is then rubbed in the same direction as the first alignment layer 105.

The process of rubbing the first and second alignment layers 105 and 203 is carried out such that pretilt angles of the first and second alignment layers 105 and 203 are in a range of 5° to 20°.

Figure 3:
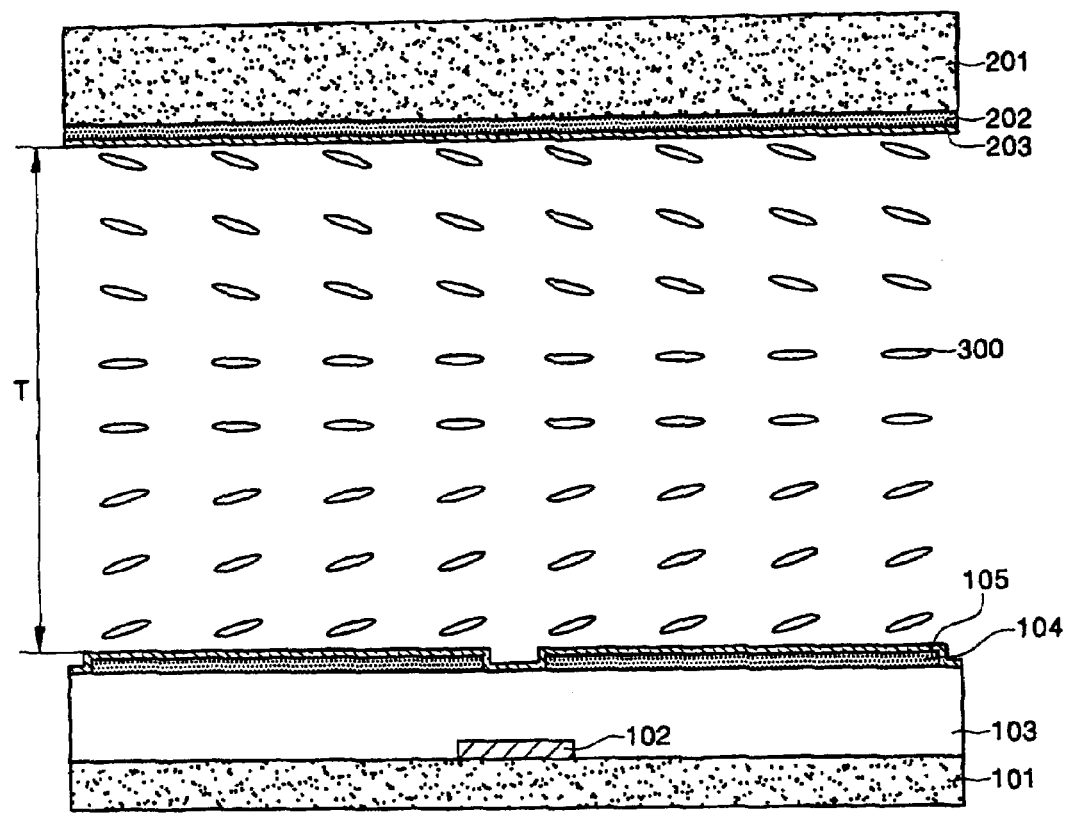

Referring to FIG. 3, the first and second substrates 101 and 201, where various elements have already been formed, are encapsulated to have the first electrodes 104 face the second electrode 202, to partially complete the LCD device.

When the first and second substrates 101 and 201 are encapsulated, an empty space having a gap of 1.5 µm to 2.5 µm between the two substrates is formed. That is, a gap (i.e. length denoted by T) between the first and second alignment layers 105 and 203 is formed in a range of 1.5 µm to 2.5 µm.

The gap between the first and second alignment layers 105 and 203 can be formed by inserting spacers between the two substrates during the encapsulation process.

Subsequently, a liquid crystal injection process is carried out, which injects a liquid crystal 300 of an Optically Compensated Bend (OCB) mode into the empty space between the two substrates. In the liquid crystal injection process, the LCD device is mounted in a vacuum device having a container in which the liquid crystal 300 is contained, and the inside of the vacuum device is placed in a vacuum state so that the empty space between the two substrates is also in a vacuum state. The LCD device is then immersed in the liquid crystal 300 and the degree of vacuum inside of the vacuum device is lowered, so that the liquid crystal 300 is injected into the empty space inside of the LCD device due to a capillary tube phenomenon and a pressure difference. The injected liquid crystal 300 forms a liquid crystal layer having a thickness equal to the gap between the first and second alignment layers 105 and 203.

The injected liquid crystal is symmetrically aligned based on a center portion between the first and second alignment layers 105 and 203 as shown in FIG. 3, and the liquid crystals disposed close to the alignment layers have predetermined inclination angles due to the pretilt angles of the alignment layers while the center portion of the liquid crystals has an inclination angle close to 0°.

The liquid crystal 300 preferably has a positive dielectric anisotropy.

Figure 4:
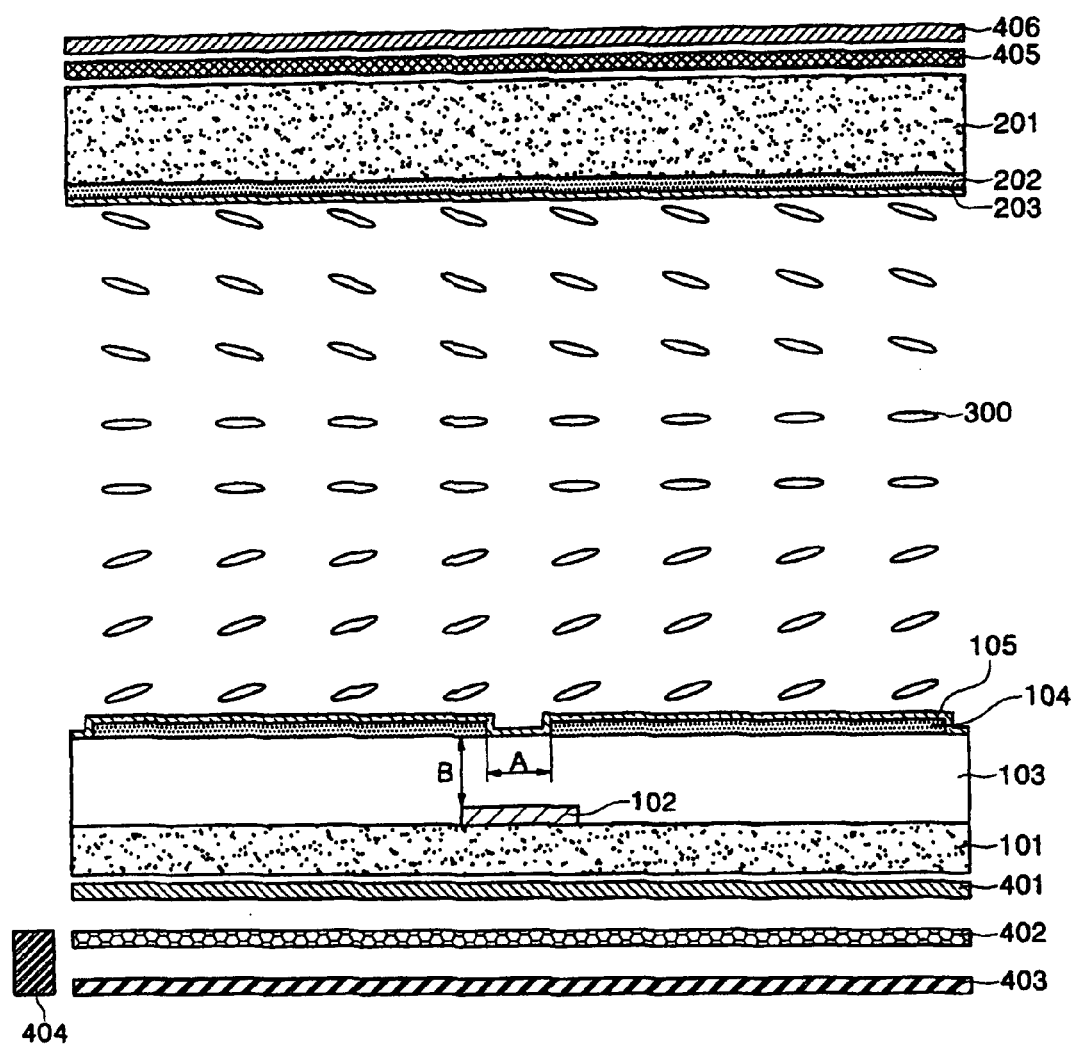

Referring to FIG. 4, a light source device, which includes a first polarizer 401, a reflector 402, a diffuser 403, and a Light Emitting Diode (LED) for emitting light, is formed on the other surface of the first substrate 101. The first polarizer 401 can be concurrently formed while various elements are being formed on the first substrate 101.

The LED 404 can use at least one group of a Red (R), Green (G) and Blue (B) group, and a Cyan (C), Magenta (M) and Yellow (Y) group. Alternatively, the LED 404 can also use White (W).

A biaxial compensation film 405 and a second polarizer 406 can also be formed on the other surface of the second substrate 201. A polarization axis of the first polarizer 401 is orthogonal to that of the second polarizer 406.

In addition, when the LED 404 corresponds to the distance W, between the second electrode 202 and the second substrate 201, a Black Matrix (BM) can be formed at a region corresponding to the region where the first electrodes 104 are not present, i.e., the interval (A) between the first electrodes 104, and a color filter can be formed at regions corresponding to the first electrodes 104.

Figure 5A:
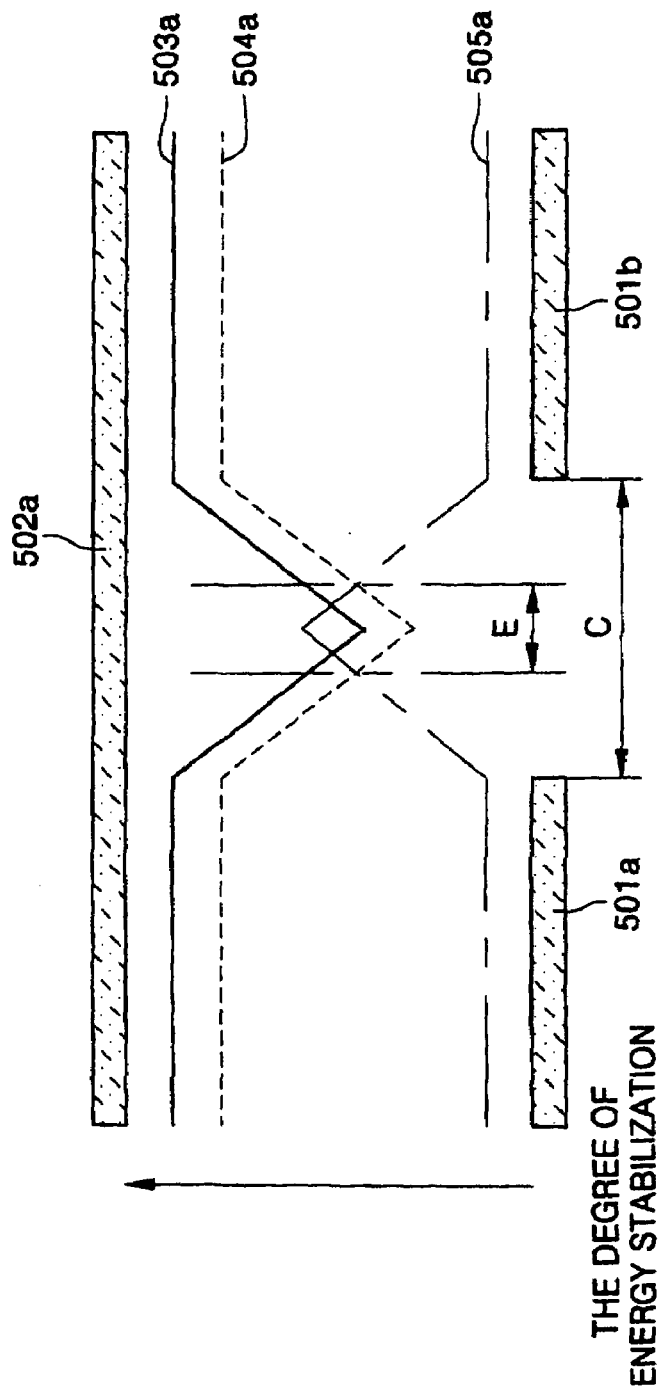

Referring to FIGS. 5A and 5B, which are schematic views for explaining an energy distribution between a second electrode and first electrodes in an LCD device not in accordance with the present invention and an LCD device in accordance with the present invention respectively, and which show intensities of the electric fields 503a and 503b, stability degrees of the bend phases 504a and 504b, and stability degrees of the splay phases 505a and 505b, respectively, when a constant voltage is supplied to the LCD device where first electrodes 501a, 501b, 501c and 501d and second electrodes 502a and 502b corresponding to the first electrodes 501a, 501b, 501c and 501d are formed.

The intensity of electric field 503a in FIG. 5A is low at a center portion of an interval C because the interval C between the first electrodes 501a and 501b is 3 µm or more, so that the stability degree of the bend phase 504a is lower than the stability degree of the splay phase 505a (E region), which leads to the result that the liquid crystal is more stabilized when it maintains the splay phase.

On the contrary, the intensity of electric field 503b in FIG. 5B is high at a center portion of an interval D because the interval D between the first electrodes 501c and 501d is 3 µm or less, so that the stability degree of the bend phase 504b is higher than that of the splay phase 505b at this portion, which thus allows the liquid crystal to be phase-changed into the bend phase.

Accordingly, when the interval between the first electrodes is 3 µm or less, the liquid crystals present at the interval between the first electrodes also have stronger intensities of electric field, so that the phase change may be readily effected between the bend phase and the splay phase in a more stable energy state.

Figure 6A:
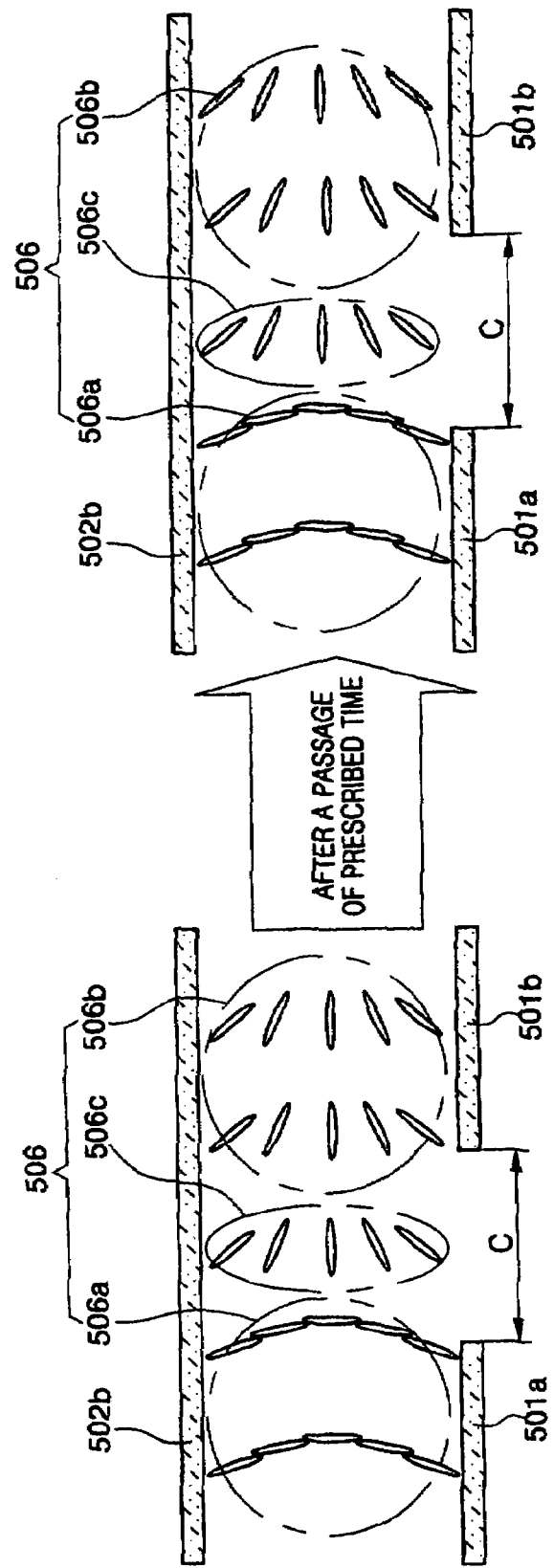
FIGS. 6A and 6B are schematic views for explaining a principle of driving a liquid crystal in an LCD device not in accordance with the present invention and an LCD device in accordance with the present invention, respectively.
Figure 6B:
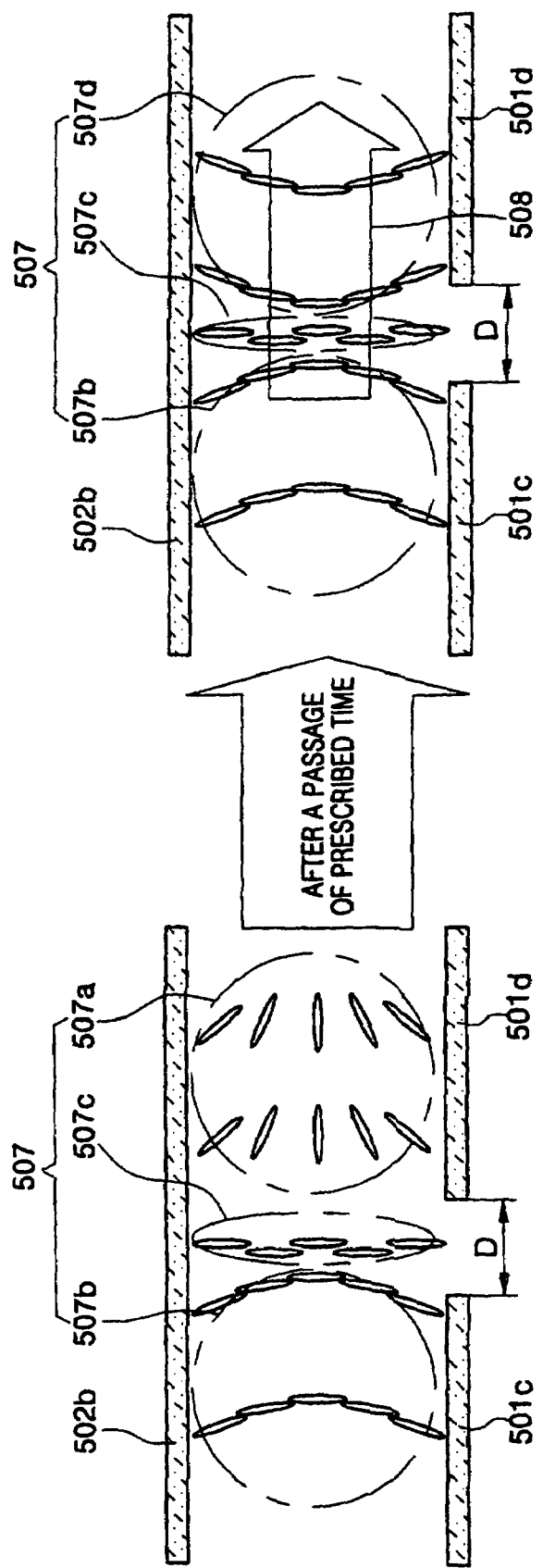

FIGS. 6A and 6B are schematic views for explaining a principle of driving the liquid crystal of an LCD device not in accordance with the present invention and an LCD device in accordance with the present invention, respectively. Referring to FIGS. 6A and 6B, when a constant voltage (initial voltage) is supplied to first electrodes 501a and 501b and a second electrode 502a of first and second pixels, (the first pixel is one including first electrodes denoted by 501a, and the second pixel is one including first electrodes denoted by 501b), as shown in FIG. 6A, a liquid crystal 506 present between the first electrodes 501a and 501b and the second electrode 502a is phase-changed from a splay phase to a bend phase due to an electric field generated by the voltage and nucleation, (the nucleation stochastically occurs so that it may not occur in a specific region), so that liquid crystals of most pixels (first pixels) are phase-changed to the bend phase liquid crystals 506a by means of the initial voltage.

However, even when an initial voltage sufficient for causing the phase change to occur is supplied to the pixels, some pixels (second pixels) are not phase-changed due to an absence of nucleation, (there may exist a probability of causing the nucleation not to occur), so that the pixels remain in the liquid crystals 506b having the splay phase.

Liquid crystals 506c positioned on the interval between the first electrodes 501a and 501b maintain the splay phase because of the same reason as described above with reference to FIG. 5A.

In general, liquid crystals have a property of propagating the phase. However, the liquid crystals 506b having the splay phase still maintain the splay phase even after a predetermined time has passed. This is because the interval C between the first electrodes 501a and 501b is too large so that the liquid crystal 506c present on the interval C does not have a stable energy state sufficient to change to the bend phase, which thus causes the phases of the bend phase liquid crystals 506a not to be propagated to the splay phase liquid crystals 506c.

Accordingly, although the initial voltage is supplied thereto, the pixel (second pixel) where the liquid crystal 506c maintaining the splay phase is present does not work properly, which causes the performance of the LCD device to be degraded.

On the contrary, according to the LCD device formed by the present invention as shown in FIG. 6B, nucleation does not stochastically occur, so that a liquid crystal of an adjacent pixel (fourth pixel) is phase-changed to the bend phase liquid crystal 507b by means of the initial voltage even when a liquid crystal of any specific pixel (third pixel) is present as the splay phase liquid crystal 507a, and when the liquid crystal present on the interval between the first electrodes 501c and 501d is phase-changed to the bend phase liquid crystal 507c due to the same reason as that described above with reference to FIG. 5B, the phase of the pixel (fourth pixel) which has been phase-changed to the bend phase liquid crystal 507b is then propagated (508) after a predetermined time has passed, so that the splay phase liquid crystal 507a is also phase-changed to the bend phase liquid crystal 507d. The third pixel is one including first electrodes denoted by 501d, and the fourth pixel is one including first electrodes denoted by 501c.

The initial voltage supplied to the first electrodes 501c and 501d and the second electrode 502b can be lower than that in the LCD device not in accordance with the present invention, wherein the initial voltage according to the present invention can be in a range of 15V to 25V, and preferably 20V. The reason is described as follows with reference to FIG. 6B. When the supplied voltage is 25V or more, most pixels are phase-changed to the bend phase. However, when it is lower than 25V, that is, 20V, nucleation does not positively occur, which causes a number of pixels (i.e. pixels such as third pixels) to occur, and when any one pixel (fourth pixel) adjacent to the pixels is phase-changed to the bend phase, pixels which are not changed (third pixels) are also phase-changed to the bend phase due to the phase propagation, so that the phase change for the whole pixels becomes possible even with a low voltage.

In addition, the phase change time may be taken for 0.2 second to 1 second which is sufficient to complete the phase change. This is because when any one pixel (the fourth pixel) is first phase-changed to the bend phase, it propagates the phase to the adjacent pixels (the third pixels) so that the adjacent pixels (the third pixels) are phase-changed readily and rapidly to the bend phase as described above, so that the time for completing the phase change, which has taken several seconds in a device not in accordance with the present invention, can take 0.2 second to 1 second in a device in accordance with the present invention.

Accordingly, nucleation does not stochastically occur, which thus does not cause the phase change to the bend phase to occur even when an initial sufficient voltage is supplied to any specific pixel (the third pixel). However, liquid crystals between pixels can be readily phase-changed to the bend phase due to the concentration of an electric field when the interval between the pixels is 3 μm or less, so that the phase propagation occurs at the pixel (the fourth pixel) where the phase change to the bend phase has occurred, which allows any specific pixel (the third pixel) having the splay phase to be phase-changed to the bend phase.

In conclusion, referring to FIGS. 4 and 6B, when the interval between the pixels is 3 μm or less, a bend phase of a pixel adjacent to any specific pixel is readily propagated to the specific pixels even when the phase change to the bend phase does not occur for the specific pixel after an initial voltage is supplied, so that the pixel where the phase change has not occurred may be phase-changed to the bend phase. However, when the interval between the pixels is made to be 3 μm or less, a problem can occur in that a parasitic capacitor is formed between the first electrodes and the conductor, such as an interconnection formed below the first electrodes, so that the insulating layer is formed to have the interval between the first electrodes and the conductor formed below the first electrodes equal 3 μm or more. As a result, a time taken for the phase change to the bend phase may be decreased, and phase propagation may be facilitated to adjacent pixels, and a problem of the parasitic capacitor formed between the metal interconnection and the first electrodes can be solved.

According to the present invention as mentioned above, in the LCD device and method of fabricating the LCD device, first pixel electrodes are spaced apart from each other by an interval of 3 μm or less, and an insulating layer is spaced apart from a metal interconnection below the first electrodes by 3 μm or more, so that an initial drive voltage of the liquid crystal in an LCD device of the OCB mode, that is, an initial drive voltage for causing a phase change from a splay phase to a bend phase to occur can be decreased. Accordingly, the problem of nucleation may be overcome, a time taken for the phase change to the bend phase can be decreased, phase propagation can be facilitated to adjacent pixels, and a problem of the parasitic capacitor formed between the metal interconnection and the first electrodes can be overcome.

Although the present invention has been described with reference to certain exemplary embodiments thereof, it will be understood by those skilled in the art that a variety of modifications and variations can be made to the present invention without departing from the spirit and scope of the present invention as defined in the appended claims.

What is claimed is:

1. A Liquid Crystal Display (LCD) device, comprising:
a first substrate;
a conductive layer arranged on one surface of the first substrate;
an insulating layer disposed directly on the conductive layer and directly on a part of the first substrate not covered by the conductive layer, and having a thickness of at least 3 μm;
first electrodes arranged on the insulating layer and spaced apart from each other by an interval of no greater than 3 μm;
a second substrate including a second electrode arranged on one surface of the second substrate so as to face the first substrate;
a liquid crystal layer interposed between the first and second substrates; and
a first alignment layer arranged on the first electrodes and a second alignment layer arranged on the second electrode, wherein the first and second alignment layers each have pretilt angles in a range of 5° to 20°.

2. The LCD device as recited in claim 1, wherein the conductive layer is arranged below the first electrodes.

3. The LCD device as recited in claim 1, wherein the insulating layer comprises a planarization layer.

4. The LCD device as recited in claim 1, wherein the insulating layer comprises one of BenzoCycloButene (BCB) and an acrylic-based material.

5. The LCD device as recited in claim 1, wherein the conductive layer comprises a metal interconnection.

6. The LCD device as recited in claim 5, wherein the metal interconnection comprises one of a scan line, a data line, and a common line.

7. The LCD device as recited in claim 1, wherein the first and second alignment layers have been rubbed in the same direction.

8. The LCD device as recited in claim 1, further comprising a first polarizer arranged on another surface of the first substrate and a biaxial compensation film and a second polarizer arranged on another surface of the second substrate.

9. The LCD device as recited in claim 8, wherein a polarization axis of the first polarizer crosses a polarization axis of the second polarizer.

10. The LCD device as recited in claim 1, wherein the liquid crystal layer has a thickness in a range of 1.5 µm to 2.5 µm.

11. The LCD device as recited in claim 1, wherein the liquid crystal layer comprises a liquid crystal having a positive dielectric anisotropy.

12. The LCD device as recited in claim 1, further comprising a light source on another surface of the first substrate.

13. The LCD device as recited in claim 12, wherein the light source includes a reflector, a diffuser, and a Light Emitting Diode (LED).

14. The LCD device as recited in claim 13, wherein the LED is at least one of a Red (R), Green (G) and Blue (b) group and a Cyan (C), Magenta (M) and Yellow (Y) group.

15. The LCD device as recited in claim 13, wherein the LED is white (W).

16. The LCD device as recited in claim 1, further comprising a color filter arranged between the second electrode and the second substrate.

17. The LCD device as recited in claim 1, wherein the liquid crystal layer comprises an Optically Compensated Bend (OCB) liquid crystal.

18. A Liquid Crystal Display (LCD) device, comprising:
a first substrate;
a conductive layer arranged on one surface of the first substrate;
an insulating layer disposed directly on the conductive layer and directly on a part of the first substrate not covered by the conductive layer, and having a thickness of at least 3 µm;
first electrodes arranged on the insulating layer and spaced apart from each other by an interval of no greater than 3 µm;
a second substrate including a second electrode arranged on one surface of the second substrate so as to face the first substrate;
a liquid crystal layer interposed between the first and second substrates; and
a first alignment layer arranged on the first electrodes and a second alignment layer arranged on the second electrode, wherein the first and second alignment layers each have a thickness in a range of 500 Å to 1000 Å.

19. A Liquid Crystal Display (LCD) device, comprising:
a first substrate;
a conductive layer arranged on one surface of the first substrate;
an insulating layer arranged on the conductive layer and having a thickness of at least 3 µm;
first electrodes arranged on the insulating layer and spaced apart from each other by an interval of no greater than 3 µm;
a second substrate including a second electrode arranged on one surface of the second substrate so as to face the first substrate; and
a liquid crystal layer interposed between the first and second substrates;
wherein the liquid crystal layer is phase-changed from a splay phase to a bend phase in response to a potential difference between the first electrodes and the second electrode being in a range of 15V to 25V.

20. The LCD device as recited in claim 19, wherein a change time of the liquid crystal layer is in a range of 0.2 second to 1 second.

21. A method of fabricating a Liquid Crystal Display (LCD) device, comprising:
forming a first substrate;
forming a conductive layer on the first substrate;
forming an insulating layer having a thickness of at least 3 µm directly on the conductive layer;
forming a first electrode material on the insulating layer;
patterning the first electrode material to form first electrodes spaced apart from each other by no more than 3 µm;
forming a second substrate;
forming a second electrode on the second substrate;
encapsulating the first and second substrates so that the first electrodes and the second electrode face each other;
filling a liquid crystal between the first and second substrates so as to form a liquid crystal layer; and
forming a first alignment layer after the formation of the first electrodes and forming a second alignment layer after the formation of the second electrode, wherein the first and second alignment layers each have at least one of pretilt angles in a range of 5° to 20° and a thickness in a range of 500 Å to 1000 Å.

22. The method as recited in claim 21, further comprising rubbing the first and second alignment layers in the same direction after the formation of the first and second alignment layers.

23. The method as recited in claim 21, wherein the step of forming the insulating layer comprises forming a layer with one of BenzoCycloButene (BCB) and an acrylic-based material using a spin coating method.

24. The method as recited in claim 23, wherein the step of encapsulating the first and second substrates comprises spacing the first and second substrates apart from each other by a gap in a range of 1.5 µm to 2.5 µm.

25. The method as recited in claim 21, wherein the step of forming the insulating layer further comprises forming the insulating layer directly on a part of the first substrate not covered by the conductive layer.

* * * * *